Aug. 19, 1969     J. R. SUMMERS     3,462,235

RIGID CANDLE WICK AND RIGID CANDLE DEVICE

Original Filed Sept. 21, 1966     4 Sheets-Sheet 1

INVENTOR.
JAMES R. SUMMERS
BY
ATTORNEYS.

Aug. 19, 1969      J. R. SUMMERS      3,462,235
RIGID CANDLE WICK AND RIGID CANDLE DEVICE
Original Filed Sept. 21, 1966      4 Sheets-Sheet 2

INVENTOR.
JAMES R. SUMMERS
BY
ATTORNEYS.

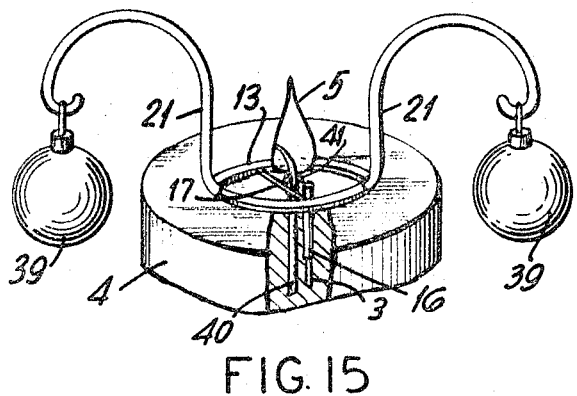
FIG. 15
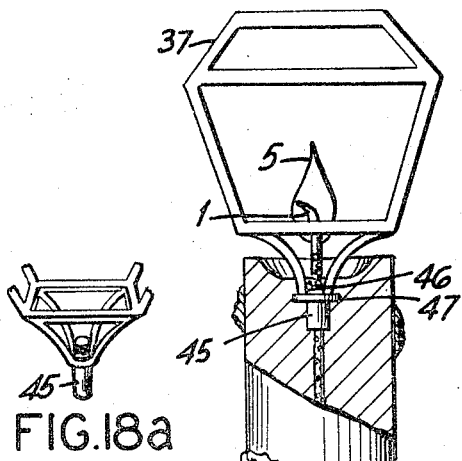
FIG. 18a
FIG. 18
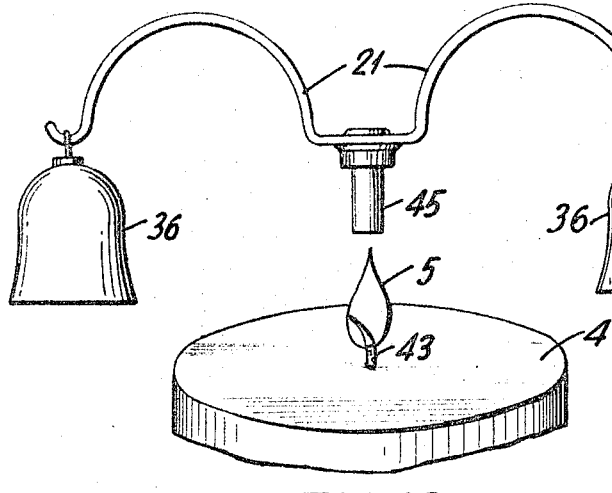
FIG. 16
FIG. 17
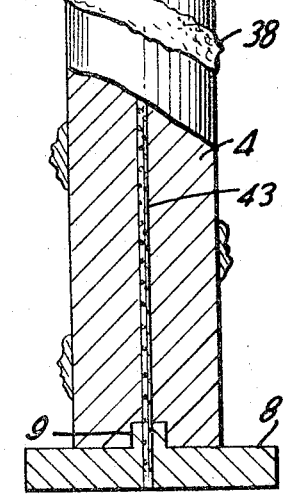
FIG. 20
FIG. 20a
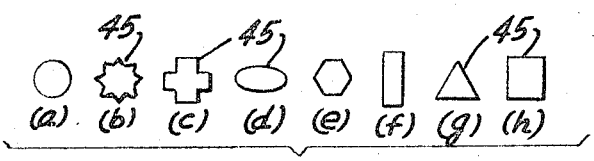
FIG. 19

(a)

(b)

(c)

(d)

United States Patent Office 3,462,235
Patented Aug. 19, 1969

3,462,235
RIGID CANDLE WICK AND RIGID
CANDLE DEVICE
James R. Summers, 353 E. 50th St.,
New York, N.Y. 10022
Original application Sept. 21, 1966, Ser. No. 581,105, now Patent No. 3,380,797, dated Apr. 30, 1968. Divided and this application Dec. 5, 1967, Ser. No. 705,252
Int. Cl. F23d 3/08
U.S. Cl. 431—289                                    20 Claims

ABSTRACT OF THE DISCLOSURE

A rigid core-wick combination for candles wherein a wick portion of normal capillarity and a non-metallic and non-explosive rigid core are employed with the core substantially consumed by a flame as the wick burns, the wick in substantially parallel relation to the core. The present invention may further include a rider adapted to descend as the rigid portion of the illuminating device is consumed.

CROSS REFERENCES

The present application is a divisional application of the invention as described in copending application, Ser. No. 581,105, filed Sept. 21, 1966 and issued as United States Patent No. 3,380,797 on Apr. 30, 1968.

The present invention relates to improved rigidized candles and illuminating devices, rigidizing cores and corewick combinations for such devices and novel combinations with such devices and it is a divisional application of Ser. No. 581,105 filed Sept. 21, 1966 and issued as United States Patent No. 3,380,797 on April 30, 1968, the said Ser. No. 581,105 being a continuation-in-part of abandoned application Ser. No. 389,397 field Aug. 13, 1964.

In my United States patent application, Ser. No. 406,037 filed Oct. 23, 1964 abandoned in favor of continuation-in-part application Ser. No. 577,268 filed Sept. 6, 1966, now Patent No. 3,401,854 is set forth candles, tapers and wicks which either have a rigidizing layer or which are rigid in themselves and have been adapted to capillarity to sustain proper candle or illuminating device burning, while retaining rigidity. Such rigidity may be imparted to a candle into which the invention is included or may be intrinsic to a taper.

The present invention relates to novel applications of rigid cores and wick devices and application of the rigidity provided by such cores with wicks, taking advantage of the rigidity provided.

The present invention differs principally from my Ser. No. 406,037 and its continuation-in-part serial number in that rigidity is provided by a core structure in a burnable combination with a wick, as distinguished from a generally non-capillary outer layer of the other invention and capillary inner layer. In the present application and in my prior application, a rigidity is imparted by the wick configuration used by the illuminating burning device. The rigidity of the core portion of the illuminating device, whether from the core alone or the core-wick combination, may be applied to novel uses.

In the case of both applications, the strength of the core or core-wick combination may be used to support the novel decoration combination of the present invention.

The cores or core-wick combination may also serve as a support among other things for the core or core-wick itself or for the illuminating device in some applications.

The need for rigidity in wicks and candles has been recognized in the past. Insofar as wicks have been concerned, the need has been dealt with by the provision of stiffeners such as thin cellulosic strips to wicks for votive candles so that such wicks could be mounted on supports to maintain them erect and avoid the unsupported wick from toppling over into a melted fuel pool and extinguishing itself. Such stiffeners have not provided more than a flexible stiffness as distinguished from rigidity to a wick or illuminating burning device.

A problem involved with stiffeners of the past also has been that they have not been adapted for full consumption by the flame and often develop dirty globules of unconsumed matter which drop off into the wax pool. Cellulosic stiffeners or other plastic cores have not been effective to provide rigidity since stiffener thicknesses sufficient to provide rigidity have not been able to bend to reach the edge of the flame to burn or discharge the accumulated matter as with normal candle burning. Where the central stiffening portion of a wick is not consumed or dropped off, the exposed surrounding wicking may increase in size and increase flame size as the fuel body descends.

In recognition of this problem, awkward attempts have been made to make certain that the stiffeners of the past were fully consumed. An attempt combining a helical winding of wicking about a guncotton stiffener raises a question as to the explosiveness of the guncotton. The complication of getting a helical winding of wicking to burn the stiffener end seems like a complicated method of achieving a simple result.

Prior expedients of using interwoven soft metal have stiffened wicks for their support as in votive candles, but have not produced a rigidity. Such wicks have usually left a melted metal residue to dirty the fuel pool.

The wick-core configurations of the present invention provide a new means of having a flame edge consume a core which is rigid enough to impart its strength to a candle or burning device or rigid enough for the core and/or core and wick to be supported.

The composition of the core is not critical as long as the core may be consumed once brought to the flame edge, is rigid and of course non-explosive. The core and wick of the present invention are able to burn with a minimum of contamination of each other and of the fuel body and may in most instances be completely and clearly consumed.

Rigidizing cores employed in the present invention are burned under circumstances allowing almost complete consumption by either getting the core by its nature to turn to the edge of the flame or being adapted to be at the edge of the flame for full consumption.

Where the core is surrounded by a capillary action wicking, the core must be consumed in order for the flame size to be relatively constant. The capillarity of the wicking could draw fuel over an ever-increasing flame area as the fuel body descends were the core not consumed by the edge of the flame.

Where stem wicks are employed the core still must be consumed but the importance of the core being brought to the edge of the flame is not as critical since the flame is regulated by the wick size. With stem wicks in particular, it is of the greatest importance that the core, while burnable, is not able to sustain capillary action. In such instance, the core would act as a wick and flame size would not be easily controllable, though a core which would bend by its nature to the side of the flame might overcome this problem.

Cores of woods such as basswood or bamboo, which have not been cut so as to burn with a bend are still effective against providing uncontrolled flames. Any capillarity in such woods is limited to a sufficently small area of outer surface as to be ineffective as a wick in itself without further treatment as may be seen in my Ser. No. 406,037 and its continuation-in-part Ser. No. 577,268 filed Sept. 6, 1966.

In the present application, reference to rigidity of the core refers to a local stiffness and toughness against breaking. A core of the present invention over any great length may be flexible and resilient, but in any short area in particular, it is stiff, having sufficient stiffness to impart a strength to a surrounding solid body of fuel. A core of the present invention may be brittle yet have strength against breaking before it reaches its brittle breaking point to provide a non-delicate spine for a candle or the like or even to support a float or decoration.

The core may be made of any number of different substances as long as there is proper selection as to burnability and preferably without residue, rigidity without overbrittleness and control over capillarity in most instances so that flame size may be controlled. Consumable plastics, woods and even fibers impregnated with substances such as shellac may be used to provide rigid cores. Each substance may need its optional adaption for use. For instance, shellac impregnated fiber must be thoroughly impregnated to keep it rigid and nonporous.

According to the present invention, a novel rigid core-wick combination is provided for candles and other illuminating burning devices, either independently or as an invention combination. The present invention includes the novel combination of a decoration adapted to descend with the fuel body of a burning illuminating device guided by a rigid core.

Although such novel feature or features belived to be characteristic of the invention are pointed out in the claims, the invention and the manner in which it may be carried out, may be further understood by reference to the description following and the accompanying drawings.

FIG. 11h is a front elevation of a twisted spiral core configuration.

FIG. 15 is a candle with a rider and decoration mounted on a core-wick configuration of the present invention.

FIG. 16 is an exploded view of a candle with a rider and decoration for a rigid wick.

FIG. 17 (a–c) is a selection of rigid wick rider details.

FIG. 18 is a decorative candle with a lamp configuration decoration mounted on a rigid wick rider.

FIG. 18a is a detail of the rider of FIG. 18.

FIG. 19 (a–h) in a section plan view of an optional selection of rider-tube configuration.

FIG. 20 is a partialy cut-away isometric elevation of a capped rider tube.

FIG. 20a is a plan view of FIG. 20.

Figure 21:
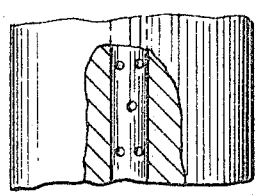
Figure 21:
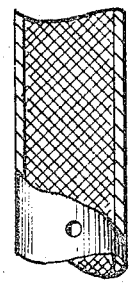
Figure 21:
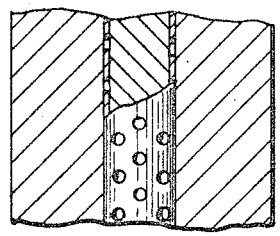
Figure 21:
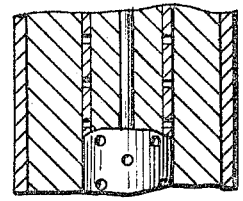

FIG. 21 (a–d) is an optional selection of rigid cores and wicks for riders of the present invention.

Referring now to the figures in greater detail, where like reference numbers denote like parts in the various figures.

The core wick 1 as shown in FIGS. 1–3a, 5 and 6, comprises an outer layer 2 of fiber wicking or cloth. The outer layer 2 surrounds a core 3 which is rigid.

The core 3 comprises a non-capillary action rigid substance of a consumable, burnable nature such as burnable fiber impregnated with shellac, various glues, casein or of plastic, wood, basswood, bamboo, some forms of stiffened or impregnated papers, cloth impregnated with casein, glue and resin. The core 3 must be selected from a material to be both burnable, strong, rigid, resilient, and preferably not very brittle. Various core combinations are adapted to different situations.

The core-wick is surrounded by the wax 4 or candle which provides the fuel for burning.

Figure 1:
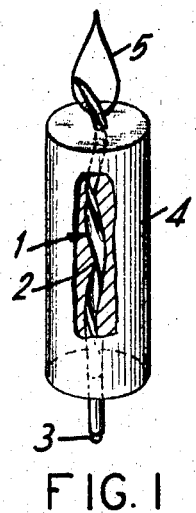
FIG. 1 is a cut-away front elevation of a candle with a spiral wick-core of the present invention.
Figure 2:
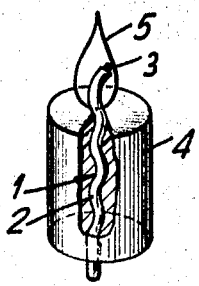
FIG. 2 is a cut-away elevation of a candle with a kinked wick-core of the present invention.
Figure 2A:
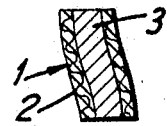
FIG. 2a is a section of the wick-core of the present invention as shown in FIG. 2.
Figure 3:
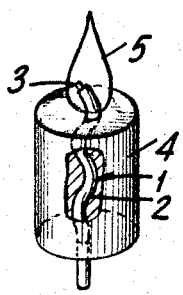
FIG. 3 is a cut-away front elevation of a candle with another form of spiral wick-core of the present invention.
Figure 3A:
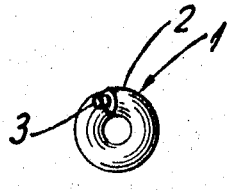
FIG. 3a is a plan view of a wick-core of FIG. 3.
Figure 5:
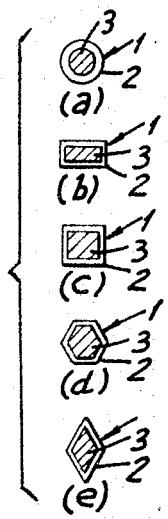
FIG. 5 (a–e) is a plan section of optional wick-core configurations.
Figure 6:
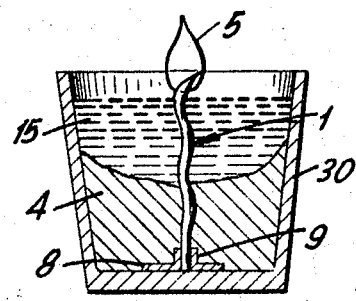
FIG. 6 is a section of a votive candle with a wick-core of the present invention.

For optimum burning, the core-wicks 1 of FIGS. 1–3a, 5 and 6 are spiral as shown in FIGS. 1 and 3 or kinked or undulating as shown in FIGS. 2 and 6. By the spiral configuration the core 3 is always held or burned toward the edge of the flame 5, preventing residue build-up or lengthening of the flame 5.

Were it not for the spiral configuration, the wicking 2 by its capillary action would draw fuel along its length supported by the core 3 and the size of the flame 5 would increase as the body of wax 4 receded.

By using the spiral configuration of core-wick 1, any intrinsic capillarity of the rigid core 3 material causes no problem of flame 5 lengthening or growing out of control since the entire core-wick 1 is consumed at the edge of the flame 5.

Cores 3 of wood, such as basswood or cores of bamboo may have some superficial capillarity which might cause trouble were the cores 3 not brought to the flame 5 edge to be consumed.

In FIG. 6 a core-wick 1 of undulating configuration is shown supported in the wax 4 in the glass 30 of a votive candle. The core-wick 1 is inserted in a support base 8 and held in the neck 9 of the support base 8. The long burning of the votive candle usually provides a great deal of heat melting much of the wax 4, causing a large fuel pool 15 to form. Without the support base 8, the core-wick 1 would fall over and be extinguished in the fuel pool 15 as the pool reached the bottom of the container 30. Without the rigidity of the core 3, the core-wick 1 could not remain erect in the votive candle even though inserted or attached to the support 8.

FIGS. 5 a–e show various core-wick 1 configurations optionally selectable or useable for various applications.

In FIGS. 7–14 are shown a variety of stem wicks, each adapted to burn fuel from the fuel pool 15 or wax 4 and be supported by a rigid core 3 which is consumed by the flame 5.

Figure 7:
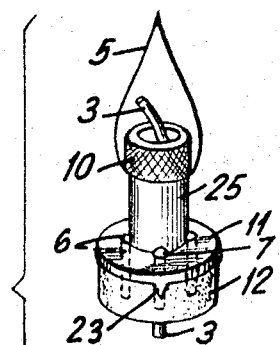
FIG. 7 is an exploded view of a stem wick, rider ring and core of the present invention.
Figure 7A:
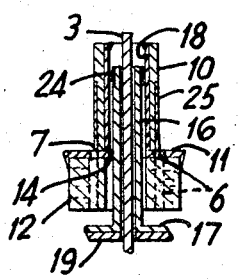
FIG. 7a is a front elevation section of the elements of FIG. 7 unexposed.
Figure 14:
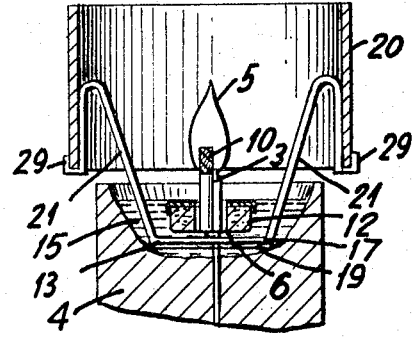
FIG. 14 is a section of candle, stem wick, core, rider and mounted decoration of the present invention.
Figure 11:
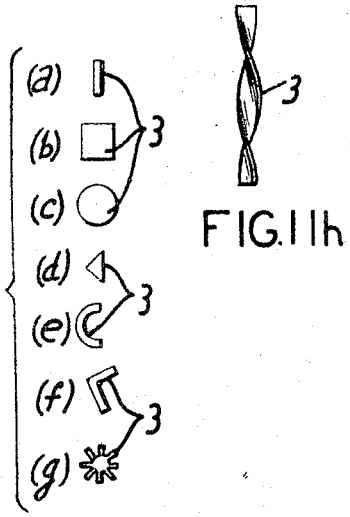

In FIG. 7 the stem wick includes a float 12 which may float in a fuel pool as shown in FIG. 14 or which may rest on the surface of the candle wax 4. The stem wick comprises a fibrous portion 10 which may be surrounded by a non-burnable shield 25 extending upward from a plate 11 which is also preferably non-burnable. The plate 11 and float 12 may be held together by gripping flanges 23. The plate 11 and shield 25 are provided with vents 7, which, alone or in conjunction with vents 6 passing through the float 12, insure easy access of the fuel to the fibrous wicking 10. As shown in FIG. 7a the wicking 10 may have an inner support layer 18.

The wicking 10 may be of almost any substance burnable or not as long as it can support capillary action to bring the fuel from the candle 4 to the burning area of the stem wick. The size of the flame is controlled by the shield 25. The shield 25 may be of metal or even non-burnable plastic. It not only supports the fiber 10 but keeps the flame from burning along the full length of the fiber 10.

The float 12 may be of cork or plastic and may be burnable though it is preferable that it not be burnable. It could also be of non-burnable plastic. Where the float is burnable, in particular, the plate 11 serves as a protection for the float 12. The weight of the plate 11 tends to keep the stem wick down in the fuel pool 15 or near the wax to assure a steady flow of fuel in burning. The vents 6, 7 further insure an even flow of fuel to the wicking 10.

The stem wick is adapted to ride on the rigid core 3. When used with a stem wick the core 3 is brought to the edge of the flame 5 as the stem wick descends in the fuel 4 and the rigid core 3 is easily consumed at the flame 5 edge. The layer 18 tends to give longitudinal stability to the stem wick on the core 3.

The stem wick may be used in conjunction with a rider which may be used for the support of decorations or for other novel purposes, all enabled by the presence of the rigid core 3. In FIG. 7 a rider is shown including a center tube 16 and a ring 13 from which may be extended supporting arms 21 for supporting various objects or decorations.

The ring 13 may be provided with connecting supports 17 joining the ring 13 and tube 16. By using the support 17, openings 22 are provided. An insulating layer 19 may be provided below the ring 13. The tube 16 may have a slight rim 24 and a slit 28.

With the slit 28 and rim 24, the rider may be loosely locked to the stem wick being squeezed between the rim 14, part of the plate 11 as shown in FIG. 7a.

The insulating layer 19 is an added protection against any heat from the flame 5 causing the ring 13 to sink too deeply in the fuel body 4.

As shown in FIG. 7a, the float and rider may move independently within the longitudinal range set by the rims 14 and 24.

Figure 8:
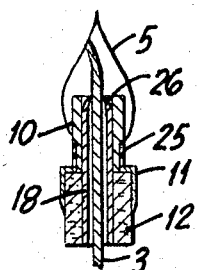
FIG. 8 is a front elevation section of a stem wick and core of the present invention.

The stem wick in FIG. 8 has an elongated float 12. The inner layer 18 which facilitates sliding of the wick along the core 3 is provided with barbs 26 as a safety device. Were the candle 4 to tip, the barbs 26 would tend to engage the core 3 and retain the stem wick from falling off the core 3.

Figure 9:
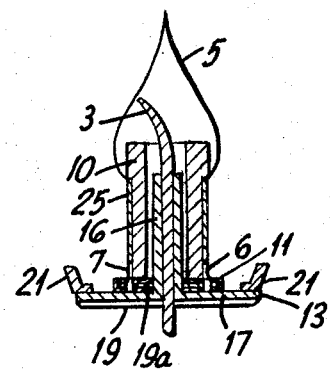
FIG. 9 is a front elevation section of a stem wick and rider ring of the present invention.

In FIG. 9 a stem wick is shown integral to the rider. The stem wick as shown may work without the layer 18 and the barbs 26. Vents 6, 7 are provided for even fuel flow to the wicking 10. The juncture between the stem wick and the ring 13 may include insulation 19a to limit heat transfer to control the descent of the rider in the wax 4.

It should be noted that the wicking 10 if of asbestos or other non-burnable substance, may be reuseable.

In FIGS. 10, 10a, 12–14 various configuration stem wicks are shown where the stem wick is mounted on the rigid core 3 with or without floats as dictated by need or desire and the wicking 10 is set to burn eccentric of the core 3. In these embodiments the bottom edge of the flame 5 burns away the top of the rigid core.

Figure 10A:
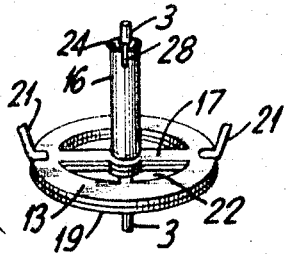
FIG. 10a is a plan view of FIG. 10.
Figure 10:
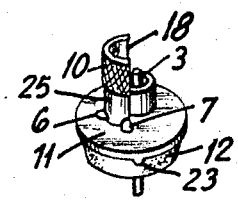
FIG. 10 is an isometric view of another stem wick and core of the present invention.

In FIG. 10 and 10a the wicking and shield 25 and wicking 10 are in a semicircular configuration about the opening through which the rigid core 3 protrudes through the rider tube 16. The stem wick as shown in FIG. 10a is provided with safety barbs 26.

Figure 12:
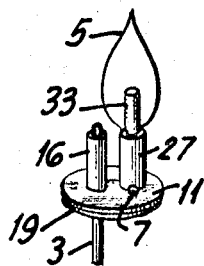
FIG. 12 is an isometric view of another stem wick and core configuration of the present invention.

In FIG. 12 a fibrous wick 33 which may be replaceable in tube 27 is set to burn near the rider tube 16. The flame 5 must be able to reach and burn the end of the rigid core 3. An opening 7 is provided to allow the fuel to reach the wick 33. The fuel may reach the wick 33 from wax melted on top of the plate 11. The fuel may reach the wick 33 even when a float 12 is used as in FIG. 13 where the float 12 does not raise the plate 11 to high above the wax 4 to permit the fuel to reach the wick 33.

Figure 13:
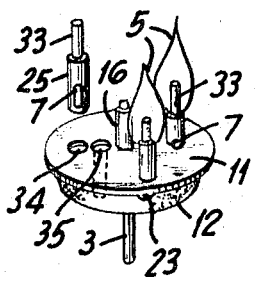
FIG. 13 is an isometric view of another stem wick and core configuration of the present invention.

In FIG. 13 several wicks 33 may be placed in the plate 11 on a float 12. The shields 25 may be removeable and insertable in openings 34. It is preferable to provide vents 35 for the fuel to be able to reach the openings 7 in the shields 25 for supplying fuel to the wicks 33. The spacing of the multiple wicks 33 must be such that the edge of the flame 5 may consume the rigid core 3.

FIG. 14 shows a rider adapted to be independently supported by the rigid core 3 with a vented floating stem wick such as shown in FIG. 10.

Figure 14A:
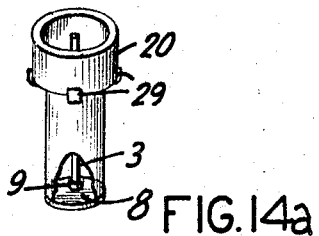
FIG. 14a is a partially cut-away isometric elevation of FIG. 14.

The arms 21 running off the ring 13 are adapted, in this instance, by a U bend to support a shade 20 which will descend with the burning of the candle 4. The support for the shade 20 and its stability are an interaction between the rider ring 13 and the core 3. In FIG. 14a cut-away details show a base 8 with a neck 9 adapted to receive the end of the core 3 and maintain it upright so that the rider and decoration or shade 20 in this case are not likely to topple as the fuel pool 15 reaches toward the base of the candle 4.

Figure 4:
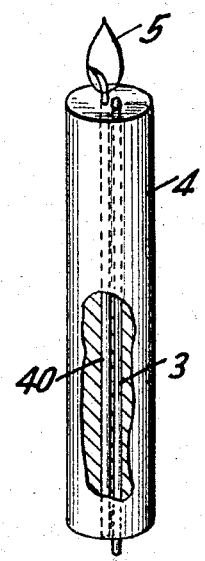
FIG. 4 is a cut-away front elevation of a candle with another embodiment of the wick-core of the present invention.

The candle 4 as shown in FIG. 4 provides a simple solution to the problem of consumption of the wick 40 and the core 3 which is set apart from the wick 40. In this instance, the wick 40 may make a natural band to the edge of the flame 5 where the carbonized end is consumed and the bottom edge of the flame 5 may consume and carry away the ash of the rigid core 3 completely, whether the core 3 be wood, such as basswood or bamboo or plastic. The rigid core 3 should never burn independently as a wick, but can burn slightly to help consume itself. The core 3 should not be of appreciable independent capillary action. The wick 40 and the core 3 must be set far enough apart so they do not come in contact with each other. Materials such as bamboo can be used with this method in heavy rods and will burn with a soft ash that is easily carried away by the flame 5. If bamboo were in contact with the wicking it would become tough and leathery and could not be consumed well by the flame 5 and might continue to build up, leaving the flame size uncontrolled.

Figure 11:
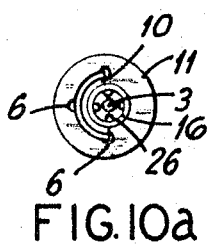
FIG. 11 (a–g) is a section plan view of an optional selection of core configurations.

In FIGS. 11 a–g, various circumferences of core 3 are shown. While almost any shape may work with the proper combination of candle size, various core shapes have certain advantages, especially with stem wicks or wicks such as shown in FIGS. 4 and 7–15 in certain uses.

Wooden cores 3 shaped as shown in FIGS. 11a, d, e and f are especially valuable since they tend to bend in burning and tend to be more quickly consumed and leave no residue especially when used with stem wicks and full length wicks such as shown in FIGS. 4, 7–15.

FIG. 11a is a front elevation of a spiral twisted core 3 which may be used in special application with various selected riders among other things.

In FIG. 15 a decoration 39 is attached to a support ring 13 with a core 3 and wick 40 substantially as shown in the candle 4 in FIG. 4. A safety guide 41 tends to keep the wick 40 and rider tube 16, which is on the core 3, the desired distance apart and tends to stabilize against irregular burning.

In FIG. 16 a rider tube 45 is provided with support arms 21 extending therefrom. The rider tube may have an opening or shape as shown in FIGS. 19 a–h, or may have a cap 31 at one or both ends as shown in FIGS.

20 and 20a. The rider tube 45 may be of selected diameter such as to fit over the outer diameter of the corewicks 1 such as shown in FIGS. 1–3. The rider may also be set over rigid wicks or tapers 43 of the kind shown in FIGS. 21 a–d as set forth in my Ser. No. 406,037 and its continuation Ser. No. 577,268 filed Sept. 6, 1966.

The support arms may support decoration such as the bell 36 as shown or any selected object such as a shade 20 or a lantern 37 as shown in FIG. 18.

FIGS. 17 a–c show various rider tubes 45. FIG. 17a has a support ring 13 and insulation 19 and openings 46 to allow fuel to reach the wicking. FIG. 17b includes a slit 44 in lieu of the opening 46. FIG. 17c shows a rider tube 45 such as used with the lantern 37 of FIG. 18.

The rider 45 over a wick taper 43 provides a safety factor in that in the event of overturning, the rider 45 usually will put out the flame 5 as it comes off.

The lantern rider of FIG. 18 and 18a may be provided with an insulating washer 47 to slow the descent of the rider by slowing the melting of the wax 4 by insulating. The candle 4 of FIG. 18 may have conventional wax decoration 38, also.

The combination of rider and rigid wick, taper or core also allows a rider or decoration to descend with the burning of the candle without having to rely on the support of the outer periphery of wax for support of the rider or decoration as in the case of riders of the past.

FIG. 21a is a perforated core-wick such as bamboo. FIG. 21b is a core-wick with a fiber inner portion and perforated rigidizing layer such as Celluloid. FIG. 21c is a taper core in a candle which might burn with a small stem wick. The inner portion is wax and the perforated layer is a rigidizing layer which might even be a glassine paper or other non-capillary action burnable substance. FIG. 21d is a taper-core such as in FIG. 21c including a conventional wick.

Each of the core-wicks or taper-cores of FIG. 21 are rigid and may be used with riders 16 and/or decorations.

Although such novel feature or feature believed to be characteristic of the invention are pointed out in the claims, the invention and the manner in which it may be carried out may be further understood by reference to the description following and the accompanying drawings.

Having thus described certain forms of the invention in some detail, what is claimed is:

1. A rigid core wick combination for an illuminating fuel burning device comprising, a wick portion, said wick portion adapted to normal capillarity, a non-metallic core, said core of non-explosive material, said core adapted to be substantially consumed by a flame on said wick portion as said wick portion burns, said core being rigid and adapted to support at least itself over a substantial length, and said wick portion external of said core portion, wherein said core includes a plurality of portions along its length offset relative to the central vertical axis of said illuminating device so as to present said portions spaced laterally from said central vertical axis.

2. The invention as claimed in claim 1 wherein the shape of said core is undulating.

3. The invention as claimed in claim 1 wherein the shape of said core is spiral.

4. The invention as claimed in claim 1 wherein said illuminating device includes a candle having meltable wax body.

5. A rigid core and wick combination in a wax candle comprising, a stem wick portion adapted to capillarity, a rigid core portion adapted to be substantially consumed by a flame as the wick portion burns, said core portion adapted to support at least said stem wick portion where- in said stem wick is adapted to ride on said core in contact with said fuel and descend as said core is consumed by said flame.

6. The invention as claimed in claim 5 including a rider adapted to descend with the consumption of said core.

7. The invention as claimed in claim 6 wherein said rider is integral to said wick.

8. The invention as claimed in claim 5 including a shield on said wick portion adapted to control said flame size.

9. The invention as claimed in claim 8 including opening adapted to permit fuel to reach said wick portion from the end of said shield away from the exposed portion of said wick portion.

10. The invention as claimed in claim 5 including a float, said float adapted to support said stem wick in a pool of melted wax.

11. The invention as claimed in claim 5 wherein said wick portion is eccentric of said core.

12. The invention as claimed in claim 11 including a plurality of stem wick portions.

13. The invention as claimed in claim 5 including insulation adapted to insulate said stem wick from the fuel of said candle.

14. The invention as claimed in claim 5 including a non-burnable layer between said wick portion and said core.

15. The invention as claimed in claim 5 including a rider adapted to descend with the consumption of said candle, wherein said rider includes means integral thereto adapted to support optional objects.

16. In combination with a wax candle, a flame consumable rigid portion extending through said candle, a rider, said rider adapted to be disposed about said rigid portion, said rider guided by said rigid portion and adapted to descend as said rigid portion is consumed.

17. The invention as claimed in claim 16 including support means on said rider adapted to support optional articles.

18. The invention as claimed in claim 16 including at least one opening in said rider adapted to admit fuel to said rigid portion.

19. The invention as claimed in claim 16 in combination with a lantern housing.

20. The invention as claimed in claim 16 wherein said rider includes a cap of optional opening shape.

References Cited

UNITED STATES PATENTS

| D. 188,689 | 8/1960 | Wolfsohn. |
| 1,184,511 | 5/1916 | Bourgeois. |
| 1,974,037 | 9/1934 | Atkins. |
| 2,001,377 | 5/1935 | Candy. |
| 2,187,053 | 1/1940 | Pratt. |
| 2,246,346 | 6/1941 | Carroll. |
| 2,254,906 | 9/1941 | Petrulis. |
| 2,829,511 | 4/1958 | Oesterle et al. |
| 3,105,373 | 10/1963 | Villemure et al. |

FOREIGN PATENTS

| 2,396 | 1/1884 | Great Britain. |
| 16,702 | 1/1915 | Great Britain. |
| 54,017 | 10/1890 | Germany. |
| 486,493 | 1/1918 | France. |

JAMES W. WESTHAVER, Primary Examiner

U.S. Cl. X.R.

431—293, 325